United States Patent

[11] 3,610,613

[72] Inventor Raymond D. Worden
Houston, Tex.
[21] Appl. No. 807,642
[22] Filed Mar. 17, 1969
[45] Patented Oct. 5, 1971
[73] Assignee Worden Quartz Products, Inc.
Houston, Tex.

[54] QUARTZ HOLDER FOR SUPPORTING WAFERS
1 Claim, 6 Drawing Figs.

[52] U.S. Cl. .......... 269 254, 269/152, 211/44
[51] Int. Cl. .......... B25b 11/00
[50] Field of Search .......... 269/254, 152; 211/41, 44; 24/261 D

[56] References Cited

UNITED STATES PATENTS

| | | | |
|---|---|---|---|
| 465,070 | 12/1891 | Trew | 211/41 X |
| 1,487,942 | 3/1924 | Hines | 211/41 |
| 2,619,233 | 11/1952 | Weiskopf | 211/41 |
| 3,480,151 | 11/1969 | Schmitt | 211/41 |

FOREIGN PATENTS

| | | | |
|---|---|---|---|
| 603,861 | 1948 | Great Britain | 211/41 |

*Primary Examiner*—Andrew R. Juhasz
*Assistant Examiner*—Donald D. Evenson
*Attorneys*—J. Vincent Martin, Joe E. Edwards and M. H. Gay

ABSTRACT: A quartz holder for supporting silicon wafers having one or more helical quartz springs for gripping and two elongate quartz rods positioned parallel to each other and parallel to the axis of the spring for assisting in supporting the wafers. Two rods parallel to and positioned against the outside of the spring for supporting the spring and a suppressor rod positioned parallel to the axis of the spring and interiorly of and through the spring for holding the spring in place while the wafers are removed. One end of the spring being freely movable along the axis of the spring allowing the spring to stretch to accommodate loading of the wafers therein.

Raymond D. Worden
INVENTOR.

BY James F. Weiler
William A. Stout

ATTORNEYS

Raymond D. Worden
INVENTOR.

BY James F. Weiler
William A. Stout

ATTORNEYS

QUARTZ HOLDER FOR SUPPORTING WAFERS

BACKGROUND OF THE INVENTION

Generally, quartz holders have been used in the past to support silicon wafers which are being subjected to various processes in the manufacture of miniature electronic devices, such as transistors. For instance, the wafers, among other processes, may be subjected to an oxidation process in which they are heated to temperatures considerably above 1000° C., are subjected to processes in which various gases react with the wafer, and are also subjected to various treating baths and drying. Quartz is a suitable material for supporting and carrying the wafers through the various processes since it can withstand the temperatures involved and won't react with and to the treatment to which the wafers are subjected.

In the past, the wafers have been supported from quartz bars which have had a plurality of fixed slots for receiving and holding the edges of the wafers. The slotted bars are inflexible and frequently break or cause the breakage of the wafers. In addition, they cover portions of the wafer which cannot be reached and treated in the various production processes and therefore such untreated portions have to be cut out and discarded. And since the slots are fixed in size and position, loading of the wafers on the holder is difficult. Also, since the thickness of the wafers changes in the manufacturing process, the wafers cannot be securely held in place by fixed width slots.

SUMMARY OF THE INVENTION

The present invention is directed to providing a quartz holder for supporting transistor wafers having one or more quartz springs for supporting wafers of various sizes and configurations. The coils of the helical springs can provide a compressional force which holds the wafers in position and will thus hold wafers of various thicknesses and will continue to securely hold the wafers even as the thickness increases or decreases in the manufacturing processes. Furthermore, the helical springs are flexible and will not break as easily as slotted rods. And since only a small area of the spring coils is in contact with the wafers, considerably less of the wafer is discarded for failure to be treated in the manufacturing process.

It is a further object of the present invention to provide one or more helical quartz springs for supporting silicon wafers for manufacturing miniature electronic devices wherein two rods are positioned parallel to and along the exterior of the spring for supporting the spring which rods may also be used, if desired, to support the wafers and allow the continued use of the spring holders even in the event a spring is broken since the coils will still continue to provide a compressional force to hold the wafers.

Another feature of the present invention is the provision of a suppressor rod positioned generally parallel to the axis of the holding springs and interiorly of the springs for holding the springs in place while the wafers are removed thereby assisting in preventing breakage of the springs.

Another feature of the present invention is the provision of allowing at least one end of the holding spring or springs to be freely movable along the axis of the spring to allow the holding spring to stretch to accommodate loading of the wafers along the holder regardless of the thickness of the wafers.

Another feature of utilizing helical quartz springs for holding wafers is that the holder will lend itself, because of the flexibility of accommodating various sizes of wafers and not requiring any exactitude in longitudinal placement of the wafers on the holder, of allowing the holder to be used with automation machinery for loading and unloading and for transferring the wafers easily from one holder to another.

DESCRIPTION OF THE PREFERRED EMBODIMENTS

Figure 1:
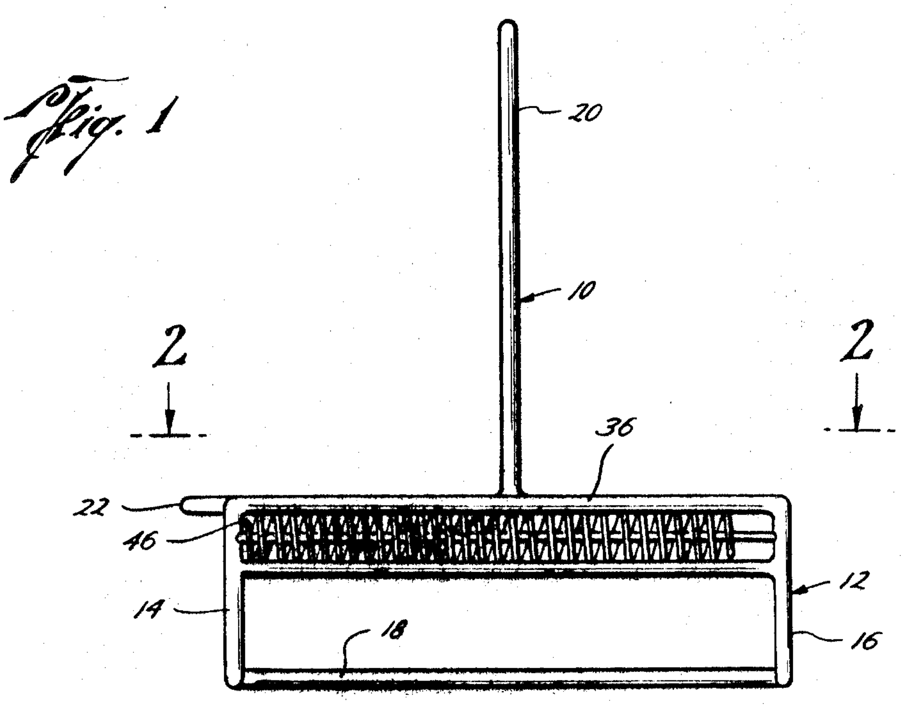
FIG. 1 is an elevational view of the preferred embodiment of the present invention utilizing at least two quartz springs in a holder.
Figures 2, 3:
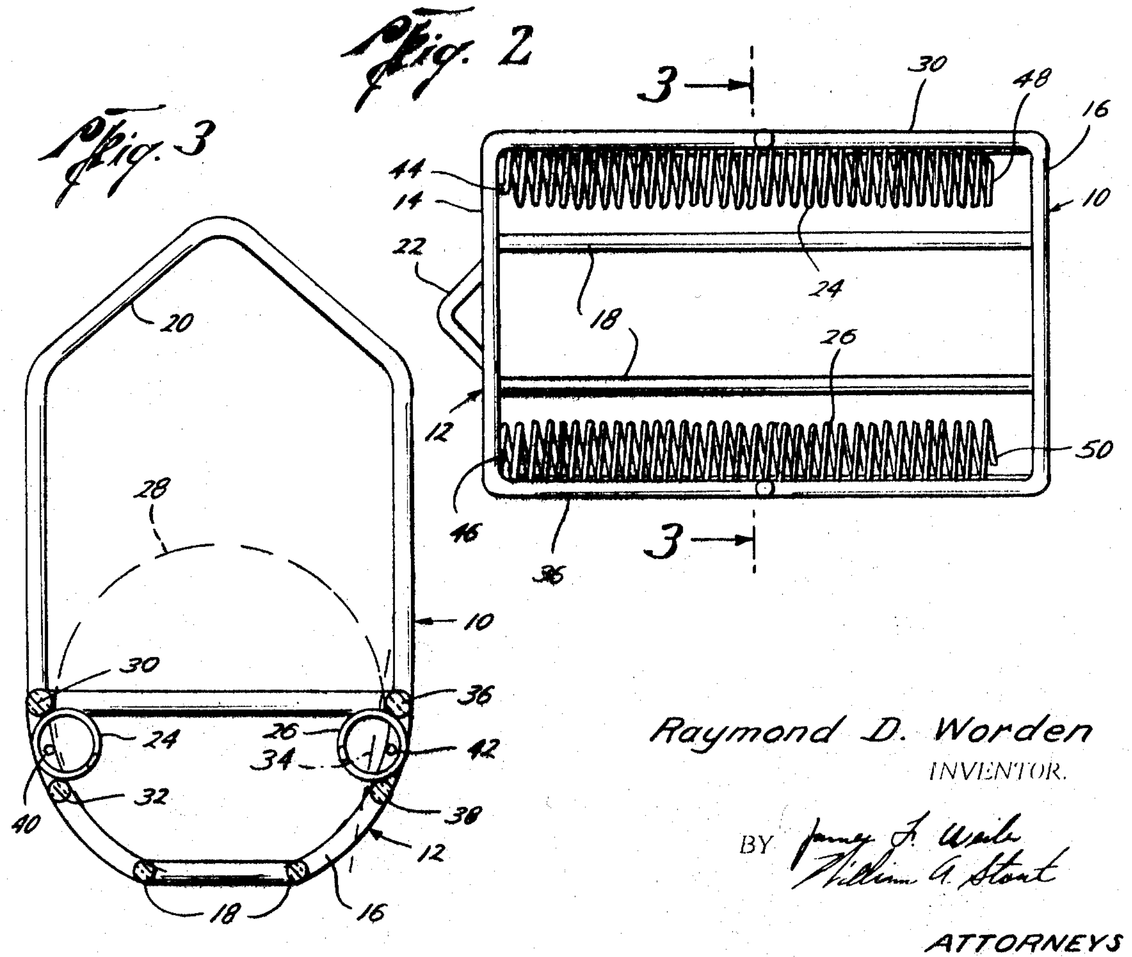
FIG. 2 is a cross-sectional view taken along the line 2—2 of FIG. 1.
FIG. 3 is a cross-sectional view taken along the line 3—3 of FIG. 2.

Referring now to FIGS. 1–3 the preferred embodiment of the quartz holder is generally indicated by the reference numeral 10 and includes a suitable frame 12 which may include end supports 14 and 16, and if desired, cross supports 18, although as will be hereinafter shown, other members can perform this latter function. Quartz holders are used for different purposes and depending upon the purpose, the frame 12 may include one or more handling supports such as a loading bail 20 or pulling hook 22, both of which may be omitted for some applications.

The present invention is directed to providing one or more helical quartz holding or gripping springs, preferably two, here shown as 24 and 26. Springs 24 and 26 are positioned parallel to each other for gripping the edges and holding a plurality of wafers, one of which 28 is shown in dotted outline in FIG. 3 held between a pair of adjacent coils on the springs 24 and 26. It is to be noted from FIG. 3 that only a small tangential line of contact on a portion of the coils of the springs contact the wafers 28 thereby insuring that only a small area, if any, of the wafers are prevented from being subjected to the manufacturing processes thereby reducing the amount of wafer area that may be subjected to being discarded as untreated. In addition, it is noted that since the springs 24 and 26 are flexible, the wafers may be inserted into the coils without requiring any amount of precision in placement and this contributes to a lessening of breaking of either the holding springs 24 and 26 or the wafers 28 which has been a problem in the past with conventional quartz holders.

Preferably, each spring is supported by first and second rods positioned about and contacting the exterior of each spring. Thus rods 30 and 32 are positioned parallel to the axis of spring 24 and on one side of a radial extending diameter 34 extending through the axis of the spring 24 for providing external support to the spring. Similarly, rods 36 and 38 are positioned parallel to the axis of and contact the periphery of spring 26. It is to be noted that rods 30, 32, 36 and 38 may function also as part of the frame 12 to hold the frame ends 14 and 16 in position. It is to be noted that rods 30 and 36 also act to support the edge of the wafers 28. Preferably, rods 30 and 36, are positioned relative to springs 24 and 26, respectively, whereby the wafers engage approximately only 25 percent of the helical diameter of the springs thereby reducing the amount of the untreated wafer area. Preferably the suppressor rods 40 and 42 are positioned between the holding rods 30 and 32, and 36 and 38, respectively, for securely holding the springs 24 and 26, respectively, in place although the suppressor rods 40 and 42 may be moved centrally positioned in the springs and act as wafer supports as well as suppressor rods.

In addition, a suppressor rod 40 is positioned parallel to the axis of spring 24 and interiorly thereof for holding the spring 24 in place when the wafers 28 are removed. Similarly, rod 42 is provided interiorly of and through spring 26 for the same purpose.

Quartz springs 24 and 26 may be connected such as by welding at ends 44 and 46 to the frame 12 for support at one or both ends. Preferably, however, the ends 48 and 50 are unattached allowing the spring to be longitudinally moved along its axis thereby permitting the spring to move and accommodate loading of the wafers as the springs 24 and 26 are able to stretch longitudinally when the wafers are inserted.

It is to be noted that the springs 24 and 26 which will be the most likely components subject to breakage will be less likely to break because they are flexible and movable and even if broken the coils will still have the capacity to provide a compressional force to hold the wafers in position and even if damaged beyond use and may be quickly and easily replaced without replacing the other parts of the holder 10.

Figure 4:
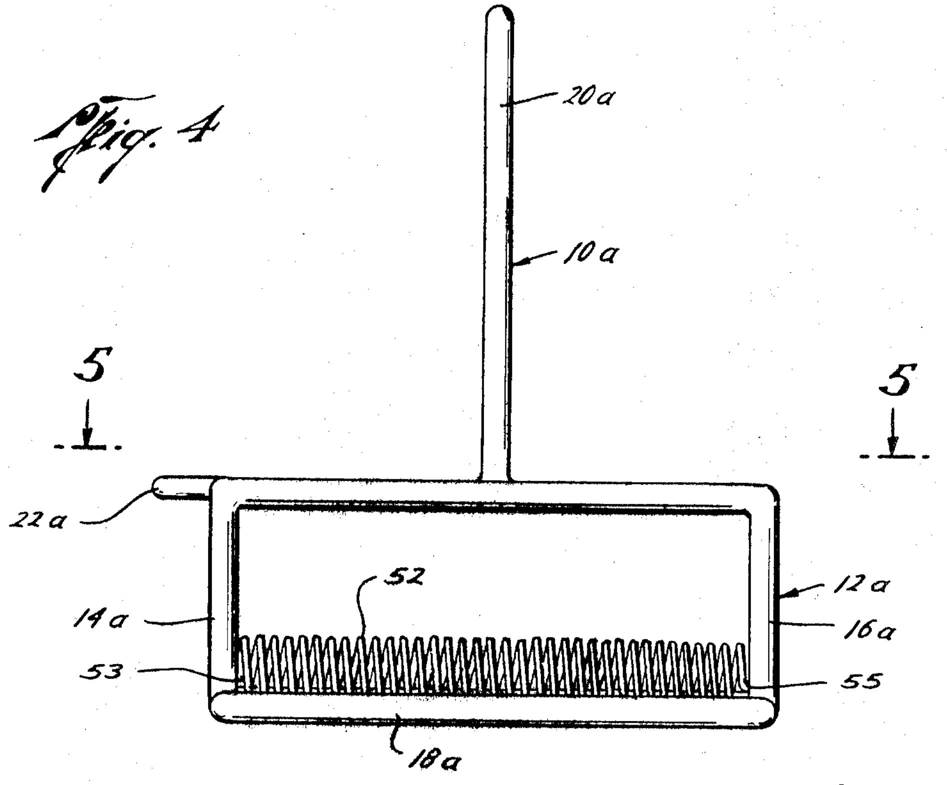
FIG. 4 is an elevational view of another embodiment of the present invention utilizing a single quartz spring in a holder.
Figures 5, 6:
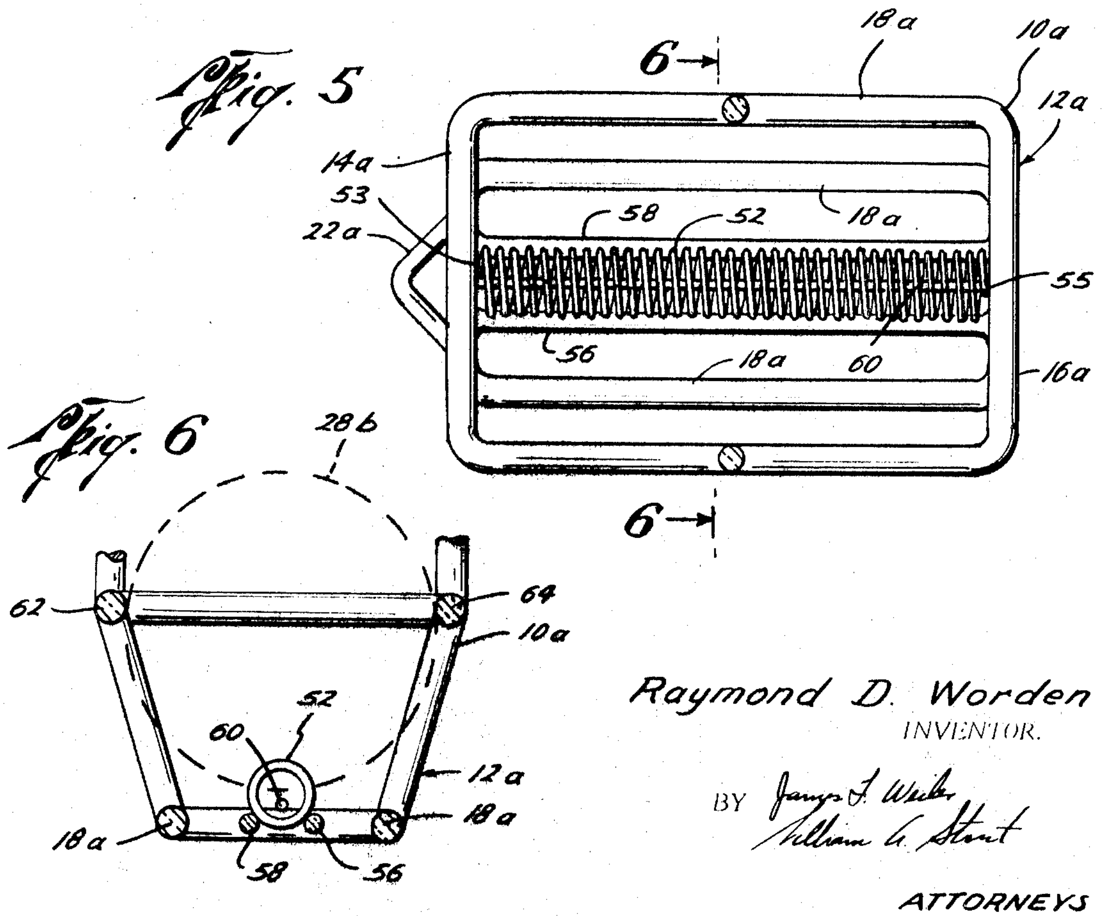
FIG. 5 is a cross-sectional view taken along the line 5—5 of FIG. 4.
FIG. 6 is a cross-sectional view taken along the line 6—6 of FIG. 5.

Referring now to FIGS. 4–6 a quartz holder having a single helical quartz spring is shown with the parts corresponding to those in FIGS. 1–3 having a suffix *a* for convenience of reference.

Thus, a spring 52 is provided, here shown connected to the frame 12*a* by welding ends 53 and 55 thereto, although of course either one or both ends may be unattached for the advantages previously mentioned in connection with the discussion of the holder of FIGS. 1–3. Again, two rods 56 and 58 are positioned adjacent the exterior of the spring 52 and parallel to its axis for support. In addition, a suppressor rod 60 is positioned interiorly of and extends through the spring 52 to hold it in place while the wafers 28*a* are removed. Also, longitudinal rods 62 and 64 are provided parallel to each other and to the axis of the spring 52 for receiving and supporting a plurality of wafers 28*b*.

In use, the quartz wafer holder 10 may be used with or without the loading bail 20 and hook 22 and a plurality of wafers 28 may be conveniently lowered into and supported from the flexible helical springs 24 and 26 either by hand or automatically and the springs 24 and 26 will because of their flexibility provide ease of loading lessening any chance of breakage of the wafers or the holder. In addition, the springs 24 and 26 will stretch to accommodate loading and will provide a compressional force to hold the wafers in position along with the support rods 30 and 26 regardless of the thickness of the wafers and whether or not the thickness of the wafers varies during manufacturing process.

The single spring holder 10*a* will similarly accommodate and hold wafers in conjunction with the support rods 62 and 64. And because of the flexibility of the holding springs automation machinery may be used for loading and unloading since preciseness of location in the leading direction of the gripping coils is not required due to the flexibility of the springs and the wafers may be easily inserted and removed.

The present invention, therefore, is well adapted to carry out the objects and attain the ends and advantages mentioned as well as others inherent therein.

I claim:

1. A quartz holder for supporting wafers comprising, a quartz frame including a plurality of parallel quartz rods, a plurality of helical quartz springs having at least one free end spaced from the frame in unstressed condition, at least three parallel quartz rods carried by the frame and holding each spring against substantial lateral movement while permitting rotative and axial movement of the spring, at least two of said rods supporting wafers in said frame by contacting the edges of said wafers, said plurality of springs gripping opposed parallel sides along a minimum peripheral area of said wafers at circumferentially spaced areas with a compressional force to prevent said wafers from contacting each other and to maintain the wafers in the holder.